Figure 1:
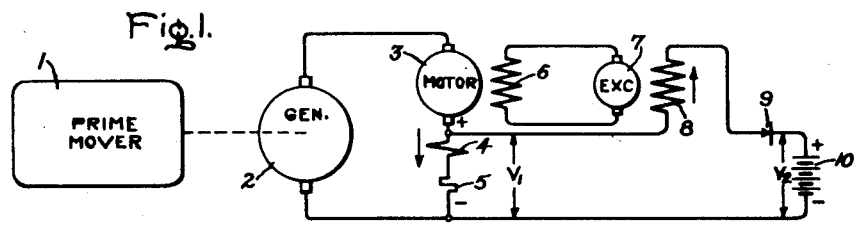

April 11, 1950  G. M. ADAMS  2,503,897
EXCITATION SYSTEM FOR DYNAMOELECTRIC MACHINES
Filed Jan. 29, 1946  2 Sheets-Sheet 1

Inventor:
George M. Adams,
by Rowell S. Mack
His Attorney.

Inventor:
George M. Adams,
by *Braxell F. Mack*
His Attorney.

Patented Apr. 11, 1950

2,503,897

UNITED STATES PATENT OFFICE 2,503,897

EXCITATION SYSTEM FOR DYNAMO-ELECTRIC MACHINES

George M. Adams, Erie, Pa., assignor to General Electric Company, a corporation of New York Application January 29, 1946, Serial No. 644,143

2 Claims. (Cl. 318—252)

My invention relates to an excitation system for dynamo-electric machines and particularly to an automatic excitation system for electric generators and motors as applied to an electrically-propelled vehicle powered by a Diesel or other type of internal combustion engine.

It is well known that the power output characteristics of a gas or Diesel engine differ widely from the load characteristics of an electric generator. Numerous systems have been devised to control or adapt the characteristics of the electrical components of such a vehicle power system in order to obtain performance characteristics of the electrical equipment which match, as nearly as possible, the output characteristics of the gas or Diesel engine. Many of the control systems which have been devised to accomplish the above have relied upon electrical control circuits comprising relays and associated resistance or rheostatic devices, operative in response to the speed of the engine or under the manual control of the operator, to vary the excitation current that is supplied to the fields of the electric generator and the electric driving motors. Systems have also been devised using nonlinear electrical networks associated with speed responsive means to secure the same result. My invention is particularly adapted to the control of power systems for self-propelled vehicles in which the generator output is supplied as electric current to one or more traction motors arranged in a series or loop circuit relationship. Inasmuch as the torque of a series motor is directly proportional to the armature current, and the armature current is approximately inversely proportional to motor speed, it follows that the torque is also approximately inversely proportional to the motor speed. Thus the available torque and driving power at the command of the operator decreases as the motor or vehicle speed increases. This is a serious disadvantage in many vehicle-drive applications where it is desirable or necessary to have available sufficient motor torque, even at high speeds, to enable the operator to accelerate the vehicle rapidly, or in the case of a vehicle such as a military tank having laterally spaced independent driving elements where it is necessary to turn the vehicle sharply and quickly by rapid acceleration of one set of the driving wheels.

Accordingly, it is an object of my invention to provide an excitation control system for dynamo-electric machines which is extremely simple and relies for its operation on a minimum number of component items.

It is a further object of my invention to provide a system of excitation for dynamo-electric machines for self-propelled vehicles in which more efficient utilization is made of the available power output of the prime mover.

Another object of my invention is to provide an excitation control system for an electric traction motor in which the armature current and resultant torque are maintained at an adequate value at maximum motor speed in order to provide the vehicle with sufficient driving and accelerating torque.

It is a specific object of my invention to provide an excitation system for a gas or Diesel electric power system wherein the excitation supplied to the fields of the electric generator or traction motor is automatically adjusted, in response to the load current, to provide optimum performance over a wide range of vehicle and engine speeds and load requirements.

The above objects and consequent advantages may be attained in accordance with my invention by providing separately excited fields, together with their associated excitation control systems, for the electric generator and traction motor. The field, or fields, may be excited by a conventional type of direct current generator which, in turn, is excited by a separately energized field. The energizing current for the field of the exciter is obtained by comparing a source of constant voltage, such as a battery or constant voltage control generator, with a variable voltage which is proportional to the armature or load current flowing in the main generator or traction motor, and applying the differential voltage obtained from such comparison to the field of the exciter for such main generator or traction motor. The measure of control thus exercised on the exciter is, in turn, effective to energize the field of the generator or motor, as the case may be. Once the values of the constant voltage and of the circuit constants required to produce the desired range of variable voltage have been selected so that the desired performance characteristics of the motor or generator have been attained, the control system is self-regulating and will function to provide optimum performance over the range of operating speed and load of the gas or Diesel engine prime mover.

In connection with my invention it should also be understood that the direct current generator, which is utilized as an exciter, is not limited to the particular type shown in the accompanying drawings but may be of the well known amplidyne-type. Such a generator is of the crossarmature reaction-excited direct-armature reaction-compensated type and is described and claimed in United States Patent No. 2,227,992, issued January 7, 1941, upon an application of Ernst F. W. Alexanderson and Martin A. Edwards. In some cases it may be advisable to use this amplidyne-type of generator where it is necessary or advisable to provide additional control features as may be obtained by the additional control fields in the amplidyne-type of generator.

For a more complete understanding of my invention and a further appreciation of its objects and advantages, reference may be had to the following detailed specification taken in conjunction with the accompanying drawings, and its scope will be pointed out in the appended claims.

Figure 2:
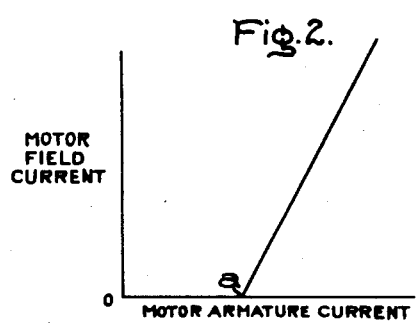
Figure 3:
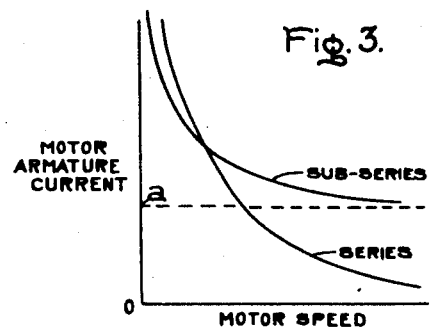
Figure 4:
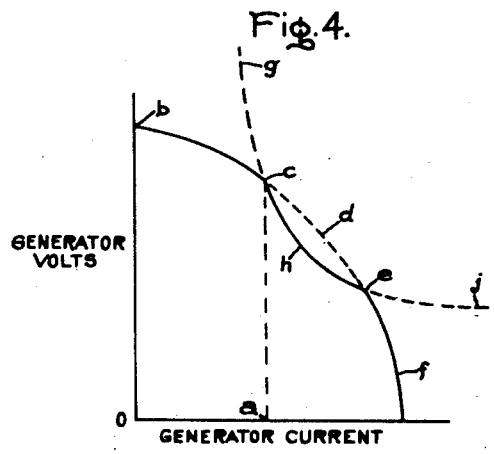
Figure 5:
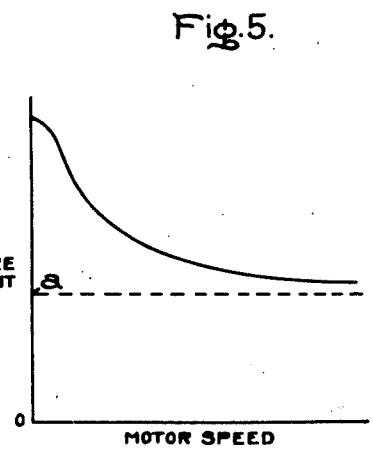
Figure 6:
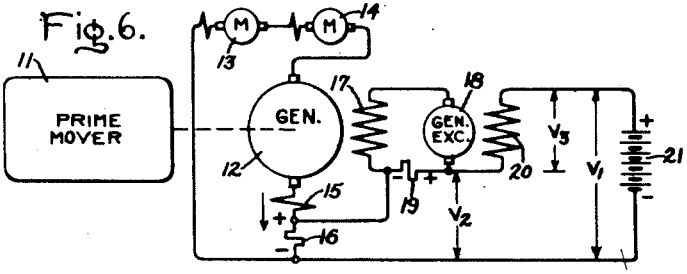
Figure 7:
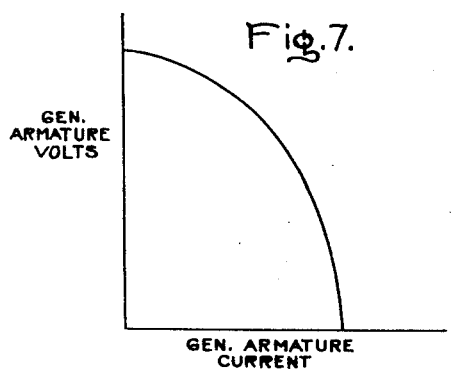
Figure 8:
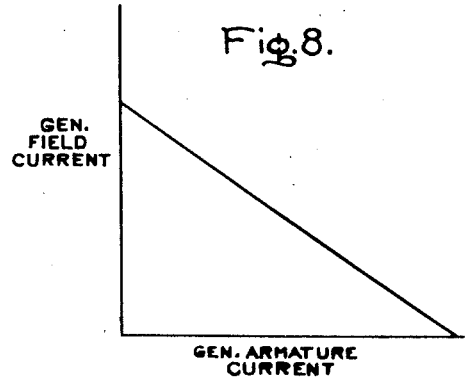
Figure 9:
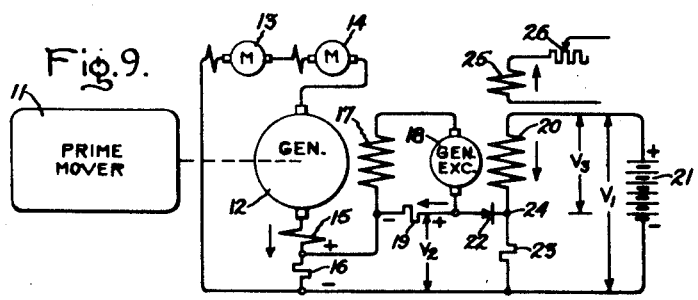

In the drawings, Fig. 1 is a simplified diagrammatic representation of my invention as applied to an electric power system comprising an electric generator driven by a prime mover and supplying load current to an electric motor of the traction-motor type. In this illustration my excitation control system is applied to the motor for obtaining desirable performance characteristics required for vehicle drive applications. It should be understood that whereas only one traction motor and one generator are shown, my invention is not limited thereto but is applicable to any desired number or combination of motors and generators. Figs. 2 and 3 are graphical representations of certain of the operating characteristics of the motor excitation system shown in Fig. 1; Fig. 4 is a graphical representation of a conventional generator voltage-load current characteristic of the type commonly used for electric vehicle applications, in which the generator is driven by a gas or Diesel engine; Fig. 5 is a characteristic armature current-speed curve of a traction motor embodying my invention and operating from an electric generator having the characteristic shown in Fig. 4; Fig. 6 is a simplified circuit diagram showing my invention as adapted to an electric generator driven by a gas or Diesel engine and supplying current to one or more traction motors in series relationship; Figs. 7 and 8 are graphical representations of certain of the performance characteristics obtained from the control system shown in Fig. 6; and Fig. 9 is a modification of the excitation system shown in Fig. 6 showing the additional feature of current limit in the generator-motor load circuit where, for certain applications, it may be desirable to limit the maximum load current which will be supplied under extreme operating conditions.

Referring now to the drawings, and particularly to Fig. 1, I have shown a prime mover 1, which may be a Diesel or other type of internal combustion engine, connected to drive a direct current generator 2 which supplies current to a load circuit including a reversible direct current traction motor 3 having a field winding 4 in series with the armature. For the purposes of my invention, motor winding 4 may be of commutating pole type or any other series field winding. A resistor 5 is included in the load circuit for purposes of obtaining a voltage drop, the importance of which will be more fully explained further on. Arranged to provide excitation for the motor 3 is a field winding 6 energized from a direct current exciter 7, which may also be driven from the prime mover 1. The direct current exciter 7 is energized and its output controlled by a field winding 8 which is arranged in series circuit relationship with a unidirectional current means, such as a rectifier 9, a source of constant voltage shown as a battery 10, and completing the circuit through the resistance 5 and motor field winding 4. For a better understanding of the operation of my excitation system, arrows indicating components of voltage $V_1$ and $V_2$, have been applied to Fig. 1 of the drawing to show the voltages involved in the operation of the circuit. The voltage $V_1$ is the potential drop that appears across that portion of the main load current circuit including the motor series field winding 4 and the resistor 5. Therefore, voltage $V_1$ is always directly proportional to the current flowing in the main generator-motor armature circuit. Voltage $V_2$ represents the constant potential of the battery 10. The value of the resistance 5 is selected so that at low values of load current, the voltage $V_1$ will be less than the battery voltage $V_2$; however, under these conditions there will be no current flowing through the field winding 8 of the exciter 7 due to the unidirectional current conducting characteristics of the rectifier 9. As the main load current increases, the voltage $V_1$ will increase proportionally until it exceeds the battery voltage $V_2$: a differential voltage will then be applied across the exciter field 8, and current will flow through this field in the direction shown by the arrow adjacent the field 8. The effect of this excitation means for energizing the exciter field 8 is shown in Fig. 2 where it will be noted that the current in the motor field 6, which is substantially directly proportional to the exciter field current, will remain zero until a point $a$ is reached corresponding to the value of motor armature current at which the IR drop across series field 4 and resistor 5 exceeds the voltage of the battery 10; in other words, $V_1$ now exceeds $V_2$. As soon as the motor armature current exceeds point $a$ in Fig. 2, the motor field current increases rapidly and in a straight line relationship directly proportional to further increases in the motor armature current. The effect of this characteristic excitation curve on the motor armature current, and consequently on the available torque of the motor under varying speed conditions, may be best understood by reference to Fig. 3. In Fig. 3, the curve labeled "series" is the characteristic speed-current curve for a series motor excited from a constant voltage source, and it should be observed that the "series" curve is asymptotic to the zero armature current axis as the motor speed increases, and asymptotic to zero speed axis as the motor armature current increases. When the excitation system as shown in Fig. 1, which I have called "sub-series" excitation, is applied to a traction motor, the characteristic performance curve is shown labeled "sub-series" on Fig. 3. In connection with this improved method of excitation it is important to note that the "sub-series" characteristic speed-current curve is asymptotic to an axis corresponding to the motor current value $a$ instead of to the zero current axis as the motor speed increases, and also asymptotic to the zero motor speed axis as the motor armature current increases. Thus, the available armature current is never less than the value $a$ irrespective of the maximum speed attained by the traction motor. The purpose of this is to extend the speed range over which a motor can be made to deliver substantial power when operating from a power supply of limited voltage and without external or additional means of field control. It is particularly applicable to electric drive systems which must deliver full power over a wide motor speed range.

Reference is now made to Fig. 4 which is a graphical representation of the performance characteristics of an electric generator driven by a Diesel or other type of internal combustion engine. The curve described by the points $b$, $c$, $d$, $e$ and $f$ is the conventional curve for the power output of an engine driven type of electric generator, whereas the curve described by the points $g$, $c$, $h$, $e$ and $j$ is a diagrammatic representation of the maximum available power output of a Diesel or other type of internal combustion engine. In the region $c$—$d$—$e$ the demand of the generator exceeds the maximum available output of the engine; therefore, for practical purposes the operator in adjusting the power output of the generator must follow the characteristic curve described by the points $b$, $c$, $h$, $e$ and $f$ if he is to prevent undesirable overloading and possible stalling of the engine when operating in the area where the generator demand exceeds the maximum engine output. Referring again to Fig. 4, if the value of armature current $a$ at which the motor field current begins to flow (refer to Fig. 2) is made approximately equal to the minimum current at which the generator can deliver full power, then the motor will deliver full power even in the maximum speed range. The advantages of a series motor with respect to high values of standstill and low speed torque are not sacrificed with this excitation system because the "sub-series" characteristic, as shown in Fig. 3, is normally steep enough in the low speed range so that the motor field strength at high values of armature current would be at least as great as the field strength of a series motor having "series" excitation only.

Fig. 5 shows the motor current-motor speed relationship for a direct current motor having "sub-series" excitation control in accordance with my invention, and being supplied current from an engine-driven generator having the output characteristic as shown in Fig. 4. As can be seen from Fig. 5, the motor armature current at low speeds is sufficiently great to provide adequate starting and low speed torque, and in addition has the advantage that a relatively high value of motor armature current is available at all speeds to provide sufficient driving and accelerating torque up to the maximum safe operating speed of the vehicle.

In Fig. 6 I have shown the excitation control system as applied to a direct current generator supplying current to one or more traction motors for a self-propelled vehicle. With the excitation system of Fig. 6 it is possible to obtain the desired generator output characteristics for the electric vehicle drive system as shown in Fig. 7, in which the generator is automatically controlled without the use of relays or adjustable rheostatic means and independent of the attention of the operator. Referring to Fig. 6, the prime mover 11, which may be a Diesel or other type of internal combustion engine, is connected to drive the direct current generator 12 which supplies the load current to the traction motors 13 and 14, respectively. Included in the main load circuit is a series field winding 15 of the main generator and a resistance 16 inserted in the circuit for the purpose of obtaining a potential drop proportional to the load current, as will be explained further on. The main generator 12 is provided with a separately energized field winding 17 electrically connected to the armature 18 of the exciter for the main generator. Included in this circuit is a fixed resistance 19 inserted for the purpose of obtaining a voltage proportional to the current in the field 17. The generator exciter 18, which may be a conventional direct current generator, or in certain cases where additional control features are desirable, an amplidyne generator may be provided as set forth in a preceding part of this specification, is provided with a field winding 20. The circuit for energizing the field 20 of the generator exciter 18 may be traced from the upper terminal of the field 20 to the positive terminal of the battery 21, then from the negative terminal of the battery to one terminal of the resistor 16 in the main load current circuit. From the other terminal of the resistor 16 a connection is made to the negative side of the resistor 19 in the main generator field circuit, and from the positive side of the resistor 19 the generator exciter field circuit is completed to the lower terminal of the field winding 20. For a ready reference in describing the operation of the circuit of Fig. 6, I have placed voltage arrows in various important parts of the excitation circuit.

Again referring to Fig. 6, the values of the resistances 16 and 19 are selected so that the voltage $V_3$ appearing across the exciter field 20 is much less than the constant voltage $V_1$ supplied by the battery 21. The exciter field voltage $V_3$ is, therefore, the difference between the battery voltage $V_1$ and the voltage $V_2$. It will be seen that the voltage $V_2$ is the sum of the voltage drop appearing across the resistor 19 and the voltage drop across the resistor 16. The voltage $V_3$ is, therefore, regulated at a value less than $V_1$, depending upon the magnitude of the variable voltages appearing across the resistors 16 and 19. Thus the voltage $V_3$ applied to the exciter field winding 20 depends primarily upon the constant voltage supplied from the battery $V_1$, the resistance value of the resistor 19 and the voltage drop due to the main load current flowing through the resistor 16. For particular values of the resistances 16 and 19, the generator field current supplied to the main generator field winding 17 by the exciter 18 will be regulated at a definite value, that value being determined by the amount of generator armature current flowing through the resistor 16. The generator excitation characteristic of the circuit of Fig. 6 is graphically shown on Fig. 8 which shows the generator field current plotted against the generator armature current. The generator field current characteristic is linear, the field current being inversely proportional to the generator armature current. The slope of this characteristic is determined by the resistance 16 in series with the generator armature, and the value of the field current at zero armature current is determined by the constant supply voltage of the battery $V_1$ and the value of the resistance 19 in the generator field circuit. I have found that this circuit produces extremely reliable excitation and main generator characteristics, and that changes in field resistance and sensitivity of the exciter exert very slight or no effect on these characteristics.

Fig. 9 is a modification of the excitation system shown in Fig. 6, and the reference characters applied to Fig. 9 are identical with respect to the corresponding elements of Fig. 6. In addition, a rectifier 22 has been inserted in the field circuit 20 of the generator exciter 18, and a fixed resistor 23 has been added between the point 24 and the negative terminal of the battery 21.

The resistor 23 thereby forms a series circuit with the battery 21 and exciter field winding 20, and functions to limit the maximum voltage that may be applied across the exciter field winding by the battery 21.

The circuit as modified in Fig. 9 functions in the same manner as the arrangement illustrated in Fig. 6, but the circuit is modified by the use of the rectifier 22 to permit the use of an additional conventional current limit circuit indicated by the differential winding 25 and its control element 26 in order to limit the load current to a value lower than the maximum value shown in Fig. 7. It is common practice to energize differentially an additional exciter field winding such as winding 25 from the difference between a voltage proportional to load current and some adjustable constant voltage, with a blocking rectifier in series in order rapidly to reduce the net exciter field strength whenever the voltage proportional to load current exceeds the constant reference voltage. With the circuit shown in Fig. 6, the differential effect of the current limit field, if added, would be offset by a similar increase in the strength of exciter field 20 in response to the regulating action of the circuit in which it is connected. This would occur when the output of the exciter was initially reduced by the current limit field. In the circuit shown in Fig. 9 the same action takes place, but because of the limited strength of exciter field 20 the differential current limit field will assume control as soon as the strength of field 20 has reached its maximum value.

The significance of the foregoing discussion relative to current limit is merely to emphasize that the arrangement of Fig. 6 must be modified in accordance with the arrangement of Fig. 9 if it is desired to use a known type of current limit field differential. The features of my invention as applicable to dynamo-electric machine excitation systems involve the means for providing a regulated field current with the regulated value varied automatically as a function of load current. The arrangement may be viewed as a circuit with a current regulator which is adjusted or calibrated in accordance with load current, and in accordance with my invention I provide a component of voltage proportional to load current and add it to a component of voltage proportional to generator field current and utilize this sum to obtain a differential voltage with respect to a constant reference voltage for energizing the exciter field.

In view of the foregoing description, it will be evident that I have provided a new and improved means of automatically adjusting or controlling the excitation of dynamo-electric machines, particularly with relation to dynamo-electric machines as utilized in a gas or Diesel-electric vehicle drive system, whereby the performance characteristics of the electrical components are closely matched to the output characteristics of the prime mover, and whereby the operation of the vehicle is improved by virtue of providing sufficient motor torque in the higher speed ranges to enable the operator to accelerate the driving motors rapidly while, at the same time, the available motor torque at standstill and under low speed operating conditions is not sacrificed.

While I have shown and described several embodiments of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. An excitation system for a dynamo-electric machine comprising a dynamo-electric machine having a field winding, an exciter for energizing said field winding, a field winding for said exciter, means for producing a variable voltage directly proportional to the armature current of said dynamo-electric machine, a source of constant voltage arranged to oppose said variable voltage, connections for applying the difference between said variable voltage and said constant voltage to said exciter field winding, and unidirectional current means to prevent said constant voltage source from energizing said exciter field winding.

2. In combination, a dynamoelectric machine having an armature circuit and a field winding, an exciter connected to said field winding, a constant voltage source, a field winding for said exciter connected in a series circuit including said constant voltage source and a portion of said armature circuit so that the voltage drop produced in said portion by the armature current of said machine opposes the voltage of said source, and means in said series circuit for permitting current to flow through said exciter field winding only when said voltage drop exceeds the voltage of said source.

GEORGE M. ADAMS.

REFERENCES CITED

The following references are of record in the file of this patent:

UNITED STATES PATENTS

| Number | Name | Date |
| --- | --- | --- |
| 1,048,548 | Kramer | Dec. 31, 1912 |
| 2,254,043 | Lynn | Aug. 26, 1941 |
| 2,305,937 | Montgomery et al. | Dec. 22, 1942 |
| 2,335,784 | Montgomery et al. | Nov. 30, 1943 |